United States Patent [19]
Clark

[11] 3,735,045
[45] May 22, 1973

[54] FRAME SYNCHRONIZATION SYSTEM FOR A DIGITAL COMMUNICATION SYSTEM

[75] Inventor: James M. Clark, Cedar Grove, N.J.

[73] Assignee: International Telephone and Telegraph Corporation, Nutley, N.J.

[22] Filed: Aug. 24, 1970

[21] Appl. No.: 66,258

[52] U.S. Cl. ..........178/69.5 R, 179/15 BS, 328/155, 307/269
[51] Int. Cl. ..............................H04l 7/08, H04j 3/06
[58] Field of Search .....................178/69.5 R, 69.5 F, 178/7.35, 7.55; 179/15 BS; 328/127, 151, 155; 307/228, 233, 269; 235/183; 325/38 B

[56] References Cited

UNITED STATES PATENTS

| | | | |
|---|---|---|---|
| 3,144,515 | 8/1964 | Kaneko | 179/15 BS |
| 3,539,825 | 11/1970 | Hardaway | 307/228 |
| 3,313,924 | 4/1967 | Schulz | 235/151.35 |

*Primary Examiner*—Robert L. Griffin
*Assistant Examiner*—John C. Martin
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A framing control circuit for a frame synchronization system employing one integrator for both the sense and search modes rather than a separate integrator for each of the sense and search modes. A voltage controlled amplitude control circuit is disposed at the input to the integrator. The control signal for the control circuit is produced by a bistable device coupled to the output of the integrator. A low binary control signal, indicating a sense mode, provides a relatively low amplitude input signal to the integrator and, hence, an effective long time constant for the integrator. A high binary control signal, indicating a search mode, provides a relatively large amplitude input signal to the integrator and, hence, an effective short time constant for the integrator.

12 Claims, 6 Drawing Figures

INVENTOR
JAMES M. CLARK
BY Alfred C. Hill
AGENT

INVENTOR
JAMES M. CLARK
BY Alfred C. Hill
AGENT

FRAME SYNCHRONIZATION SYSTEM FOR A DIGITAL COMMUNICATION SYSTEM

BACKGROUND OF THE INVENTION

This invention relates to digital communication systems, such as time division digital multiplexers including pulse code modulation (PCM) equipment, and more particularly to the framing control circuit for frame synchronization systems employed therein.

The general problem is to establish and maintain frame synchronization of a digital communication link in the presence of noise or bit error. A frame synchronization system controls the timing counters of a digital multiplexer to make the counter timing synchronous with the format of the received data. This system has two primary functions: (1) to sense when synchronization is lost and (2) to change the phase of the counters, as required, until synchronization is achieved. A reference synchronization pattern generated by the counters is compared with the incoming signal to detect whether or not the counters are synchronized. If synchronization is lost, the equipment will switch to a search mode. In the search mode, the phase of the counters are changed until it is detected that synchronism is achieved after which the frame synchronization system will change to a sense mode to detect a subsequent loss of synchronization.

In the past, the framing control circuit employed two integrator circuits for each control circuit; one integrator for the sense mode and another integrator for the search mode. The reason for this is that the sense mode requires a long time constant to render the framing control circuit insensitive to input signal fading and the search mode requires a short time constant to enable rapid acquisition of synchronism. A compromise time constant could not be determined to satisfy both requirements and until the present time there was no apparent way to switch (automatically change) the time constant of a single integrator. Therefore, the two integrators each with different time constants were employed.

SUMMARY OF THE INVENTION

An object of this invention is to provide an integration system which has at least two different effective time constants, one effective time constant being employed with the equipment in the search mode and the other effective time constant being employed with the equipment in the sense mode.

Another object of this invention is to provide a framing control circuit for a frame synchronization system which employs a single integrator having a controllable time constant so that the single integrator can be used in both the sense and search modes resulting in an economization in the equipment required in the framing control circuit.

A feature of this invention is the provision of a frame synchronization system comprising a source of binary information signal having a given bit rate and containing a synchronization component; first means to produce a plurality of timing signals; second means coupled to the source and the first means to examine successive bits of the information signal to recognize the synchronization component and produce a resultant output signal at each examination indicating either an in-synchronization condition or an out-of-synchronization condition; third means to integrate the resultant output signal; fourth means coupled to the output to the third means responsive to the integrated output signal thereof to produce a first control signal indicating either an in-synchronization condition or an out-of-synchronization condition; fifth means coupled between the second and third means and to the fourth means responsive to the first control signal to adjust the amplitude of the resultant output signal applied to the third means to enable the third means to perform a slow integration of the resultant output signal for an in-synchronization condition of the first control signal and a fast integration of the resultant output signal for an out-of-synchronization condition of the first control signal; and sixth means coupled to the first means, the second means, the third means and the fourth means to provide a second control signal for timing adjustment of the timing signals when the resultant output signal and the first control signal indicate an out-of-synchronization condition and the amplitude of the result of the fast integration of the third means has exceeded a given value.

Another feature of this invention is the provision of an integration system having an adjustable time constant comprising a source of input signal to be integrated; first means to integrate the input signal; second means coupled to the output of the first means responsive to the integrated output signal to produce a control signal; and third means coupled between the source and the first means and to the second means responsive to the control signal to adjust the amplitude of the input signal applied to the first means and thereby adjust the effective time constant of the first means.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figures 1, 6:
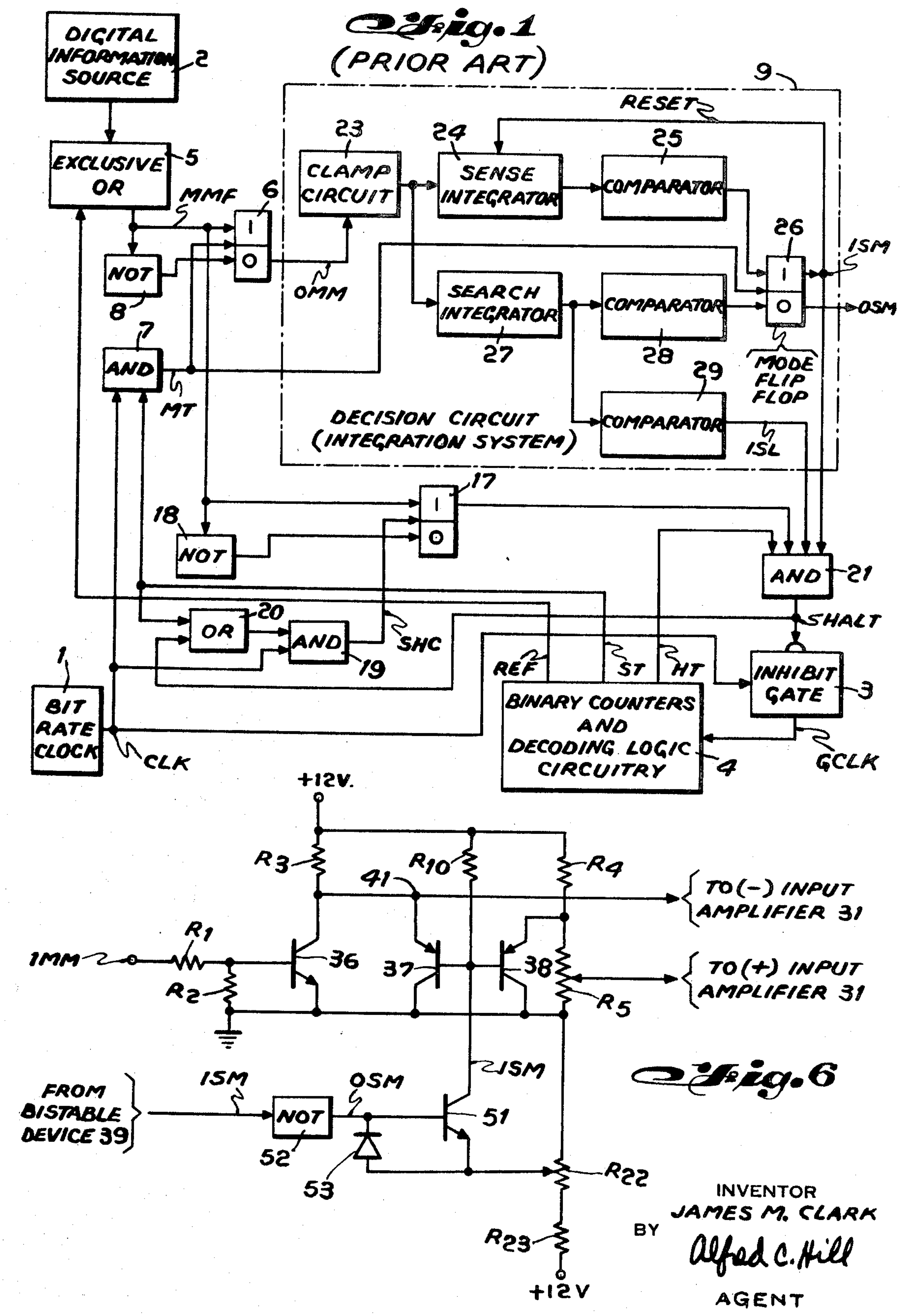
Fig. 1 (PRIOR ART), Fig. 6
FIG. 1 is a block diagram of a prior art frame synchronization system incorporating a prior art integration system as the framing control circuit for the frame synchronization.
FIG. 6 is a schematic diagram of an alternative amplitude control circuit which may be substituted for the amplitude control circuit illustrated in FIG. 2.

Referring to FIG. 1, there is illustrated therein a block diagram of one embodiment of a frame synchronization system similar to that disclosed in a first copending application of J. M. Clark Ser. No. 781,181, filed Dec. 4, 1968, now U.S. Pat. No. 3,597,539 whose disclosure is incorporated herein by reference. The frame synchronization circuit of FIG. 1 incorporates as the decision circuit thereof a prior art integration system employing two integrators, one for the sense mode and the other for the search mode. Clock 1 produces clock pulses at the bit rate of the digital (binary) information signal from source 2 and is applied through INHIBIT gate 3 to binary counters and decoding logic circuitry 4 to produce various timing signals necessary for the operation of the frame synchronization system, as well as the timing signals necessary for other functions, such as demultiplexing the multiplexed signal received from source 2. For purposes of explanation, it will be assumed that the frame rate of the information signal is 8 KHz (kilohertz), that the received one bit distributed synchronization code has the pattern in adjacent frames of 1, 0, and that the local synchronization reference signal referred to as REF is a 4 KHz square wave. Other timing signals generated by circuitry 4 are the synchronization bit time signal ST having a constant width of one clock period and the halt time signal HT having a varying width equal to the width of the HALT pulse plus the width of a one clock period.

The need for the signal HT is to prevent the frame synchronization system from locking in a unsynchronized and stationary condition upon power turn-on, since components 6, 9 and 17 could otherwise assume a combination of states that would stop the counters of circuitry 4. The lack of timing signals would prevent flip flops 6 and 17 from leaving the above combination of states. By utilizing the signal HT, the counters of circuitry 4 are allowed to stop only when timing signals are available to flip flops 6 and 17.

The information signal from source 2 and the local synchronization reference signal REF from circuitry 4 are applied to a digital comparison means in the form of EXCLUSIVE OR gate 5 which compares the binary conditions of the successive bits of the information signal and the REF signal. Gate 5 will then produce a resultant output signal which indicates a match or a mismatch between the binary conditions of the two input signals applied thereto. The resultant output signal has been designated the MMF signal. The MMF signal is applied directly to flip flop 6. Flip flop 6 is triggered by the MT signal at the output of AND 7 to sample the MMF signal. AND 7 has its inputs coupled to clock 3 and the ST signal output from circuitry 4. The signal from gate 5 will be sampled by the leading edge of the MT signal and the state of flip flop 6 will be changed on the trailing edge of the MT signal for the type of flip flop assumed for illustration. Thus, if the MMF signal is a binary 1, representative of a mismatch, the output from flip flop 6 will be changed to a binary 1 in time coincidence with the trailing edge of MT signal. This output from flip flop 6 is designated 1 MM. The output from gate 5 is also coupled to NOT 8. Thus, when the MMF signal is 0, representative of a match, the output of NOT 8 will be a 1 which will be sampled at the leading edge of the MT signal and at its trailing edge will cause flip flop 6 to change its state, thus, producing on its 1 output a binary 0 condition.

The output from flip flop 6 is coupled to decision circuit or integration system 9 which determines whether the samples presented thereto indicate a synchronized condition.

The output from gate 5 is also coupled to flip flop 17 directly and through NOT 18 with the triggering pulses therefore being provided from AND gate 19 and OR gate 20. The input to OR 20 is the ST signal from circuitry 6 and the output of AND gate 21 whose operation will be explained hereinbelow. The inputs to AND 19 is the output from OR 20 and the output from clock 1, thereby, generating a SHC trigger signal for flip flop 17. AND 21 determines whether a HALT pulse should be coupled to the inhibit terminal of INHIBIT 3 to change the phase of the timing signals at the output of circuitry 4 by momentarily halting the counting of the binary counters. AND 21 receives the SL (search level) output of decision circuit 9, the output of flip flop 17, and the SM (search mode) output of decision circuit 9. Also, the HT signal from circuitry 4 is coupled to AND 21 and has the purpose as hereinabove mentioned. Thus, when any of the input signals to AND 21 are in a 0 binary condition there is no HALT or inhibit signal produced and the counters of circuitry 6 will count normally without interruption. When all the input signals to AND 21 are in the 1 binary condition, namely, HT timing signal present, there is a 1 output from flip flop 17, SL signal is 1 and SM signal is 1, AND 21 will produce a HALT pulse which will inhibit gate 3, thus stopping the counting action of the counters of circuitry 4 and resulting in a shift of the phase or timing of the timing signals produced by circuitry 4. The amount of phase shift is dependent upon how many clock pulses are inhibited as is fully explained in said first copending application.

Decision circuit 9 illustrates in block diagram form the framing control circuit employed in prior art arrangements as mentioned hereinabove under the heading "Background of the Invention". When synchronization has been established, the 0 output of flip flop 6, to invert the 1 output of flip flop 6 is coupled to claim circuit 23 to precisely define the binary levels of the inverted output of flip flop 6. The output of circuit 23 is coupled to the sense integrator 24 whose output is coupled to comparator 25. Integrator 24 when synchronization is present will provide a relatively low output from comparator 25, thus, placing mode flip flop 26 in a state where its 1 output is in a 0 binary condition. In addition, the search integrator 27 together with its comparator 28 will produce a relatively high output to mode flip flop 26 assuring the above mentioned state of flip flop 26. Additionally, comparator 29 coupled to the output of integrator 27 will provide a relatively low output to AND 21 when this system is in synchronization.

When sense integrator 24 and comparator 25 detect an out-of-synchronization condition by receiving from flip flop 6 a large number of mismatch signals, comparator 25 will produce a high output and comparator 28 will produce a relatively low output, thereby, resetting flip flop 26 under control of the triggering signal MT from AND 7. Thus, since integrator 24 and comparator 25 have detected an out-of-synchronization condition and has caused the integration system 9 to switch to the search mode resulting in a 1 binary condition from the 1 output of flip flop 26 and a 1 binary condition from comparator 29. These conditions are coupled to AND 21 and provided the other signals coupled thereto are in a 1 condition the desired halting will result to cause the system to regain synchronization. The reset conductor from the 1 output of flip flop 26 is to protect the sense integrator 24 against a sequence of short fades by forcing more current through the sense integrator and, thus, render the integrator 24 less vulnerable to such a sequence of short fades which could give an erroneous out-of-synchronization condition.

Figures 2, 3, 4, 5:
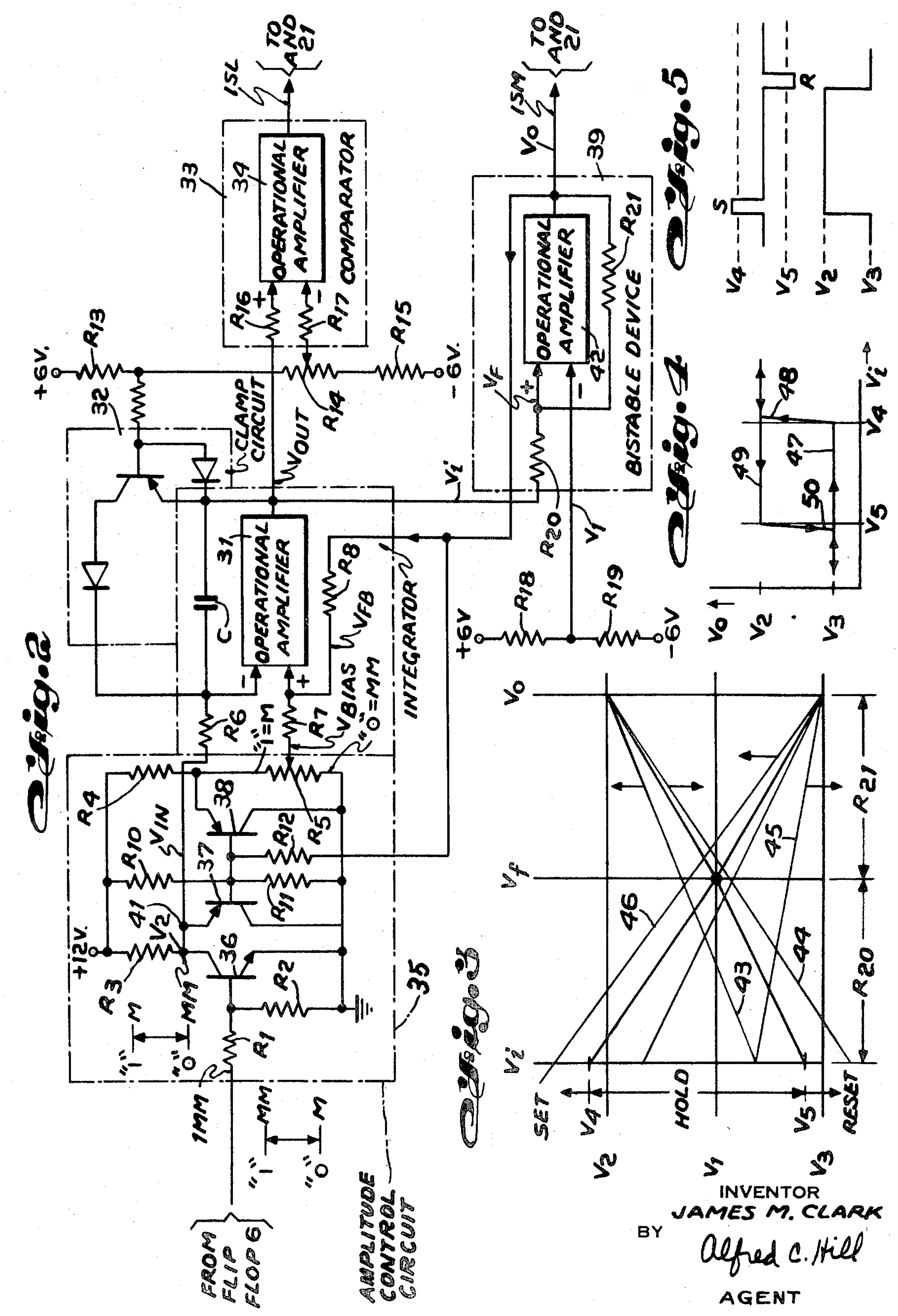
FIG. 2 is a schematic diagram, partially in block form, of an integration system in accordance with the principles of the present invention which may be substituted for the integration system of the frame synchronization system of FIG. 1.
FIGS. 3, 4 and 5 are diagrams useful in explaining the operation of the bistable device of the integration system of FIG. 2.

In accordance with the present invention the circuit of FIG. 2 is substituted for decision circuit 9 of FIG. 1 to bring about the advantages available in the circuitry of FIG. 2, such as eliminating one integrator, two comparators and the mode flip flop, and providing an integration system employing only one integrator which is adjustable to have a first effective time constant suitable for the sense mode operation and a second effective time constant suitable for the search mode operation.

While it has been mentioned that the circuit of FIG. 2 could be substituted for the decision circuit 9 of the synchronization system of FIG. 1 (the system described in said first copending application), the same circuitry of FIG. 2 could be substituted for the decision circuit of the frame synchronization circuit described in a second copending application of J. M. Clark, Ser. No. 780,981, filed Dec. 4, 1968, now U.S. Pat. No. 3,594,502 whose disclosure is incorporated herein by reference.

It has been determined that if one integrator is found which enables adjustment of its time constant to perform both the sense and search mode integration it would be possible to eliminate one integrator and also achieve other economizations. The function performed by mode flip flop 26 and the two associated comparators 25 and 28 could be performed by a bistable device set by one level and reset by another level where the levels are levels of the same signal. This approach is possible only when comparators 25 and 28 receive their input signal from the same integrator. The bistable device could be constituted by one operational amplifier (a high gain differential amplifier) with appropriate feedback and would replace comparators 25 and 28 and flip flop 26.

One approach to obtaining an integrator with a switchable time constant is to use a voltage controlled resistor, such as a lamp and photosensitive resistor, where the lamp receives the control voltage and the photoresistor provides a variable resistance in response to the intensity of the light received from the voltage controlled lamp, the photoresistor being the R of an RC time constant circuit.

An entirely different approach, however, has been taken and resulted in the circuit arrangement as illustrated in FIG. 2. The approach taken was to consider that the time constant of an integrator is essentially the same as the gain of the integrator:

$$V_{out} = 1/RC \int (V_{in} - V_{bias})\, dt$$
$$= -G \int (V_{in} - V_{bias})\, dt;$$

where $G$ = gain = $1/RC$.

In other words, attenuating the input by a factor of two, or doubling the resistance of the resistor used, or doubling the capacitance of the capacitor used, one at a time, all have the same effect. However, the basic relation of $V_{in}$ to $V_{bias}$ must not be changed by the attenuation. For example, if $V_{in}$, is switching between logic levels of 0.0 and + 2.0 volts, and $V_{bias}$ = + 1.5 volts, the effective time constant can be decreased by decreasing the amplitude of $V_{in}$ to switch from 0.0 to 1.0 volts, but then $V_{bias}$ must be changed to 0.75 volts to preserve the ratio of differences $V_{in}$ (high) − $V_{bias}/V_{bias}$ − $V_{in}$ (low).

The circuit to provide such an arrangement is illustrated in FIG. 2. FIG. 2 includes integrator 30 incorporating operational amplifier 31, capacitor C and resistor R6, the latter two components forming the time constant of the integrator. The inverting input (− input) of operational amplifier 31 is coupled to the junction of resistor R6 and capacitor C with the output of amplifier 31 being coupled to the other side of capacitor C and to a clamp circuit 32 having the function spelled out with reference clamp circuit 15 of to FIGS. 5 and 6 of said first copending application. Namely, clamp circuit 32 provides negative feedback to prevent the output of amplifier 31 from going below a specified voltage, called the clamp voltage.

Resistor R7 is coupled to variable resistor R5 to enable the adjustment of the bias applied to the non-inverting input (+ input) of amplifier 31. The output of amplifier 31 is also coupled to comparator 33 in the form of operational amplifier 34 to provide the SL output to AND 21 (FIG. 1) which will be a binary 1 output when the integration system is in the search mode and a binary 0 output when the integration system is in the sense mode. The decision level voltage for operational amplifier 34 is coupled to its inverting input by resistor R17 coupled to a variable resistor R14, a part of a voltage divider including R13, R14 and R15. The non-inverting input of amplifier 34 is coupled to the output of amplifier 31 by resistor R16.

The effective time constant of integrator 30 is adjusted in accordance with the principles of this invention by amplitude control circuit 35 including transistors 36, 37 and 38. Resistor R3 is a collector resistor for transistor 36 coupled to a +12 volt power supply. Resistor R4 is an emitter resistor for transistor 38 coupled to the +12 volt power supply and resistor R5 is an emitter resistor for transistor 38 coupled to ground. Transistors 37 and 38 can be a matched pair and the value of resistors R5 and R7 are chosen to present approximately the same impedance to amplifier 31 as resistor R6.

The bistable device 39 is coupled to the output of amplifier 31 as illustrated and provides the SM output to AND 21 (FIG. 1). Bistable device 39 provides an output signal having one of the two binary conditions which is coupled to amplitude control circuit 35 to adjust the amplitude of the input signal $V_{in}$ coupled to integrator 30 and to the non-inverting input of amplifier 31 to adjust the $V_{bias}$ applied thereto. The amplitude control voltage from device 39 would be low (binary 0) for the sense mode providing a relatively low amplitude input signal to integrator 30 for slow integration of the input signal applied thereto. A high (binary 1) output from device 39 is present during the search mode which will provide a relatively high amplitude input signal to integrator 30 so that the integration will occur at a greater speed which effectively amounts to a short time constant relative to the time constant when the equipment is in the sense mode. The control signal from device 39 may be coupled to the non-inverting input of amplifier 31 via resistor R8 if it is desired to provide a lower threshold probability for search mode than for sense mode. This is accomplished by decreasing $V_{bias}$ relatively to $V_{in}$ for the sense mode and increasing $V_{bias}$ relative to $V_{in}$ for the search mode. This is accomplished, as illustrated, by the positive feedback path present between the output of amplifier 31 and the non-inverting input of amplifier 31, said feedback path including bistable device 39 and resistor R8.

The framing control circuit of FIG. 2 not only eliminates the components mentioned hereinabove but also the voltage regulation circuitry.

The operation of the circuit of FIG. 2 will now be discussed. The input from flip flop 6 (FIG. 1) the MM (mismatch) and M (match) conditions, respectively, are applied through resistor R1 across resistor R2 to the base of transistor 36. When transistor 36 is non-conducting, transistor 37 is conducting and acts as an emitter follower applying the potential present at the junction of resistors R10 and R11 to the point 41 which provides one amplitude (the higher amplitude) for $V_{in}$ ($V_2$) to the inverting input of amplifier 31. Transistor 36 will be in its non-conducting state when the output from flip flop 6 indicates a match M. This match is represented by a binary 0 at the base of transistor 36 and a binary 1 at the collector of transistor 36 due to inversion taking place in transistor 36. However, this binary 1 has a value of voltage which is clamped by the voltage at the junction of resistors R10 and R11. Transistor 38 will also be conducting and act as an emitter follower generating the same clamp voltage across resistor R5. Resistor R5 has a value of resistance which is not too large as compared with the resistance of resistor R4.

With the above operating condition the system is in a sense mode and operational amplifier 31 will be integrating at a slow rate (an effective relatively long time constant) and will be providing an output therefrom which is low with respect to the decision level of comparator 33 and the bias $V_1$ applied to the inverting input of operation amplifier 42, a part of bistable device 39. Thus, both amplifiers 34 and 42 will provide a binary 0 condition at their output.

Now assume that synchronization is lost. The output of flip flop 6 will start providing a sequence of binary 1s (indicating a mismatch) rendering transistor 36 conductive which will cause its collector to go toward a relatively low value. Even with transistors 37 and 38 still conducting, this drop in collector voltage will cause the voltage on the inverting input to decrease below the bias on the non-inverting input of amplifier 31 resulting in a + output therefrom. This + output will in a relatively short period of time provide a 1 output from amplifiers 34 and 42. Due to the result of a 1 output from amplifier 42 there will be an additional voltage present on the bases of transistors 37 and 38 through means of resistor R12 resulting in an increase in the voltage at point 41 such that $V_{in}$ to operational amplifier 31 will increase and integration will proceed at a faster rate (have an effective relatively short time constant) as required in the search mode. In addition, the output from bistable device 39 through the means of resistor R8 adjusts the bias $V_{bias}$ to accomplish the results mentioned hereinabove relative to the adjustment of this bias voltage.

When the input from flip flop 6 indicates that the counters have been adjusted for synchronism with the received data (a 0 output) transistor 36 will become non-conductive and the framing control circuit will return to the operating conditions pointed out hereinabove for the sense mode until synchronization is again lost.

Referring to FIG. 3, there is illustrated therein a nomograph useful in explaining how an operational amplifier can function as a bistable device. Primarily the operational amplifier, such as amplifier 42, is capable of bistable operation due to the feedback provided by resistor R21. Line 43 indicates one relationship between $V_i$ and $V_o$. This line intersects the vertical scale line for feedback voltage $V_f$ at a point higher than $V_1$. This indicates a positive differential input voltage, which makes $V_o$ as high as possible, that is, equal to $V_2$. It should be noted however, that for some conditions, the operation of this bistable device depends on the previous history, that is, what state it was previously in. Thus, if for the same input voltage as for line 43 the bistable device 39 was instead in a state represented by $V_o$ equal to $V_3$ (represented by line 45), it would stay in this state, or if it was in a state represented by $V_2$ it would stay in this state. When the input occurs along a line equal to or less than $V_5$, such as line 44, this input would be less than the voltage $V_f$ and would tend to force the bistable device to provide an output equal to $V_3$ and would go into this condition if not already in this condition. Thus, when a line defining the input and output of the bistable is less than $V_1$ at the intersection with the feedback voltage $V_f$ a "reset" occurs provided the device is not already reset.

Now consider the situation where the input and output is defined by line 45. In this situation, line 45 intersects the feedback voltage line $V_f$ at a point less than $V_1$ and the output will tend to decrease, but due to the feedback will not, since the input is in the "hold" region. Once the input is present on a line greater than $V_4$, such as line 46, there is a tendency to increase the output signal from amplifier 42 due to the fact that this line intersects voltage $V_f$ at a point greater than $V_1$. The output will increase toward $V_2$ and will "set" to this value, if the bistable device is not already set.

FIG. 4 represents a hysteresis loop defining the operation of operational amplifier 42 and its associated feedback provided by resistor R21. It will be noted that after bistable device is in condition represented by $V_3$ and the input voltage $V_i$ increases from $V_5$ to $V_4$, this increase will occur along line 47 and will be set to the binary condition represented by voltage $V_2$ at $V_4$ along line 48 and will stay at this level with a continuing increase of $V_i$. As $V_i$ is decreased, the bistable device will remain at the binary condition represented by $V_2$ until it reaches the voltage $V_5$, as indicated by line 49, and then will be reset along line 50 to the binary condition represented by voltage $V_3$.

FIG. 5 illustrates the input pulses which will set and reset bistable device 39 and produce an output pulse having two binary levels, the reset level at $V_3$ and the set level at $V_2$.

There may be situations where the voltage swing produced by the control signal output of amplifier 42 is not sufficient to achieve the desired selection of effective time constants for integrator 30. If the voltage swing of the amplitude control voltage from device 39 is not sufficient a stage of amplification may be provided as illustrated in FIG. 6. In this instance, resistors R22 and R23 provide a voltage divider to provide the proper working voltage for the emitter of transistor 51. The adjustment provided by resistor R22 is for the purposes of adjusting the sense time, that is, the initial time constant value for the sense mode operation. A decrease in resistance will increase the sense mode time constant and an increase in resistance will decrease the sense mode time constant. This is accomplished by changing the operating point of transistor 51. Since transistor 51 provides inversion, NOT 52 is provided, as illustrated, between the output of bistable device 39 and the base of transistor 51. Diode 53 protects against reverse base to emitter bias.

When the system is in the sense mode, the output from device 39 is 0 which through NOT 52 will cause a 1 to be applied to the base of transistor 51. Thus, transistor 51 will conduct resulting in conduction of transistor 51 and a relatively low voltage at the bases of transistors 37 and 38 which will operate as described with reference to FIG. 2 to apply a relatively small input signal to the inverting input of amplifier 31. However, when the system is in the search mode, transistor 51 is rendered non-conductive and the voltage developed at the bases of transistors 37 and 38 will increase due to the voltage drop across transistor 51. Thus, a higher input to amplifier 31 will result and thereby provide the desired fast integration of the input signal applied thereto which is required in the search mode.

Returning again to FIG. 2, the clamp input signal from the collector of transistor 36 is integrated as follows:

$$V_{out} = -1 / R_6 C \quad \int (V_2 - V_{bias})\, dt \text{ where}$$

$V_{out}$ = output of amplifier 31

$V_2$ = Voltage at collector of transistor 36

$V_{bias} = (V_T R_8 + V_{FB} R_7/R_8 + R_7)$ where $V_T$ = voltage at tap of resistor R5

$V_{FB}$ = voltage fed back from output of amplifier 42

(This assumes that R5 << R7)

As mentioned hereinabove clamp circuit 32 and comparator 33 operate as described with reference to FIGS. 5 and 6 of said first copending application. Operational amplifier 42 is bistable due to the positive feedback. The switching points of the time constant of integrator 30 depends on the high and low output voltage (full on, or full off) of operational amplifier 42 as well as the resistor ratios of the weighted resistors R10, R11 and R12 and the resistors R5, R7 and R8.

Bistable device 39 is not clocked by the MT signal as was done with the mode flip flop 26 of the prior art arrangement of FIG. 1. This clocking was done previously to prevent the mode from changing in the middle of the search logic operation. But the 1SM output of amplifier 42 gates only the HALT signal and this is gated also by the 1HT signal which limits the effect of the 1SM signal on the search logic to 1HT time. The 1HT signal is one bit after the 1ST and the 1MT signals. Thus, there is no harm in not clocking the 1SM signal. The 1SL signal from comparator 33 has practically the same application as in the prior art arrangements and it is (and was) not clocked.

Assuming that the circuit added in accordance with the principles of this invention is about the same in size, cost, etc., as the voltage regulators and comparator circuits that were eliminated, the size and cost saved by this novel approach is approximately one operational amplifier, one comparator, one flip flop and their associated passive components.

While I have described above the principles of my invention in connection with specific apparatus, it is to be clearly understood that this description is made only by way of example.

I claim:

1. A frame synchronization system comprising:

a source of binary information signal having a given bit rate and containing a synchronization component;

first means to produce a plurality of timing signals;

second means coupled to said source and said first means to examine successive bits of said information signal to recognize said synchronization component and produce a resultant output signal at each examination indicating either an in-synchronization condition or an out-of-synchronization condition;

third means to integrate said resultant output signal;

fourth means coupled to the output of said third means responsive to the integrated output signal thereof to produce a first control signal indicating either an in-synchronization condition or an out-of synchronization condition;

fifth means coupled between said second and third means and to said fourth means responsive to said first control signal to adjust the amplitude of said resultant output signal applied to said third means to enable said third means to perform a slow integration of said resultant output signal for an insynchronization condition of said first control signal and a fast integration of said resultant output signal for an out-of-synchronization condition of said first control signal; and sixth means coupled to said first means, said second means, said third means and said fourth means to provide a second control signal for timing adjustment of said timing signals when said resultant output signal and said first control signal indicate an out-of-synchronization condition and the amplitude of the result of said fast integration of said third means has exceeded a given value.

2. A system according to claim 1, wherein said first means further produces a local binary synchronization reference signal; and said second means includes digital comparison means coupled to said source and said first means to compare the binary condition of successive bits of said information signal and the binary condition of said reference signal and produce said resultant output signal.

3. A system according to claim 1, wherein said third means includes an operational amplifier having an inverting input, a non-inverting input and an output, a resistor coupled between said fifth means and said inverting input, a capacitor coupled between said output and said inverting input, a clamp circuit coupled between said output and said inverting input to prevent the output signal of said amplifier at any time from going below a given fixed voltage, a bias source coupled to said non-inverting input, and means coupled between said fourth means and said non-inverting input responsive to said first control signal to adjust the amplitude of the bias voltage on said non-inverting input in step with the adjustment of the amplitude of said resultant output signal.

4. A system according to claim 1, wherein said fourth means includes a bistable device.

5. A system according to claim 4, wherein said bistable device includes an operational amplifier having an inverting input, a non-inverting input and an output, a bias source coupled to said inverting input, means coupling said non-inverting input to the output of said third means, a feedback means coupled between said output and said non-inverting input, and means coupling said first control signal from said output.

6. A system according to claim 1, wherein said third means includes a first operational amplifier having an inverting input, a non-inverting input and an output, a resistor coupled between said fifth means and said inverting input of said first amplifier;

a capacitor coupled between said output and inverting input of said first amplifier, a clamp circuit coupled between said output and inverting input of said first amplifier to prevent the output signal of said first amplifier at any time from going below a given fixed voltage, a first bias source coupled to said inverting input of said first amplifier, and seventh means coupled between said fourth means and said non-inverting input of said first amplifier responsive to said first control signal to adjust the amplitude of the bias voltage on said non-inverting input of said first amplifier in step with the adjustment of the amplitude of said resultant output signal; and said fourth means includes a bistable device including a second operational amplifier having an inverting input, a non-inverting input and an output, a second bias source coupled to said inverting input of said second amplifier, eighth means coupling said non-inverting input of said second amplifier to said output of said first amplifier, a feedback means coupled between said output and said non-inverting input of said second amplifier, and ninth means coupling said first control signal from said output of said second amplifier to said fifth means and said seventh means.

7. An integration system having an adjustable time constant comprising:

a source of input signal to be integrated;

first means to integrate said input signal;

second means coupled to the output of said first means responsive to the integrated output signal to produce a control voltage; and a voltage controlled amplitude control means coupled between said source and said first means and to said second means responsive to said control voltage to adjust the amplitude of said input signal applied to said first means from said source and thereby adjust the effective time constant of said first means;

said input signal being a binary signal;

said control voltage being a binary signal;

said voltage controlled amplitude control means responding to one binary condition of said control voltage to provide said first means with a first effective time constant and the other binary condition of said control voltage to provide said first means with a second effective time constant different than said first effective time constant; and said second means including a bistable device;

said bistable device including an operational amplifier having an inverting input, a non-inverting input and an output, a bias source coupled to said inverting input, means coupling said non-inverting input to the output of said first means, a feedback means coupled between said output and said non-inverting input, and means coupling said control voltage from said output.

8. An integration system having an adjustable time constant comprising:

a source of input signal to be integrated;

first means to integrate said input signal;

second means coupled to the output of said first means responsive to the integrated output signal to produce a control voltage; and a voltage controlled amplitude control means coupled between said source and said first means and to said second means responsive to said control voltage to adjust the amplitude of said input signal applied to said first means from said source and thereby adjust the effective time constant of said first means;

said first means including an operational amplifier having an inverting input, a non-inverting input and an output, a resistor coupled between said amplitude control means and said inverting input, a capacitor coupled between said output and said inverting input, a clamp circuit coupled between said output and said inverting input to prevent the output signal of said amplifier at any time from going below a given fixed voltage, a bias source coupled to said non-inverting input, and means coupled between said second means and said non-inverting input responsive to said control signal to adjust the amplitude of the bias voltage of said non-inverting input in step with the adjustment of the amplitude of said input signal.

9. A system according to claim 8, wherein said input signal is a binary signal, said control voltage is a binary signal, and said voltage controlled amplitude control means responds to one binary condition of said control voltage to provide said first means with a first effective time constant and the other binary condition of said control voltage to provide said first means with a second effective time constant different than said first effective time constant.

10. A system according to claim 9, wherein said second means includes a bistable device.

11. A system according to claim 10, wherein said bistable device includes an operational amplifier having an inverting input, a non-inverting input and an output, a bias source coupled to said inverting input, means coupling said non-inverting input to the output of said first means, a feedback means coupled between said output and said non-inverting input, and means coupling said control voltage from said output.

12. An integration system having an adjustable time constant comprising:

a source of input signal to be integrated;

first means to integrate said input signal;

second means coupled to the output of said first means responsive to the integrated output signal to produce a control voltage; and a voltage controlled amplitude control means coupled between said source and said first means and to said second means responsive to said control voltage to adjust the amplitude of said input signal applied to said first means from said source and thereby adjust the effective time constant of said first means;

said first means including a first operational amplifier having an inverting input, a non-inverting input and an output, a resistor coupled between said amplitude control means and said inverting input of said first amplifier, a capacitor coupled between said output and inverting input of said first amplifier, a clamp circuit coupled between said output and inverting input of said first amplifier to prevent the output signal of said first amplifier at any time from going below a given fixed voltage, a first bias source coupled to said non-inverting input, and third means coupled between said second means and said non-inverting input of said first amplifier responsive to said control voltage to adjust the amplitude of the bias voltage on said non-inverting input of said first amplifier in step with the adjustment of the amplitude of said input signal; and said second means including a second operational amplifier having an inverting input, a non-inverting input and an output, a second bias source coupled to said inverting input of said second amplifier, fourth means coupling said non-inverting input of said second amplifier to said output of said first amplifier, a feedback means coupled between said output of said second amplifier and said non-inverting input of said second amplifier, and fifth means coupling said control signal from said output of said second amplifier to said amplitude control means and said third means.

* * * * *